United States Patent
Narigapalli et al.

(10) Patent No.: US 11,436,145 B1
(45) Date of Patent: Sep. 6, 2022

(54) ANALYTICS-DRIVEN DIRECTION FOR COMPUTER STORAGE SUBSYSTEM DEVICE BEHAVIOR

(71) Applicant: KYNDRYL, INC., New York, NY (US)

(72) Inventors: Anil Kumar Narigapalli, Hyderabad (IN); Laxmikantha Sai Nanduru, R K Puram Post (IN); Clea Zolotow, Key West, FL (US); Gavin Charles O'Reilly, Kilcoole (IE); Venkateswarlu Basyam, Hyderabad (IN)

(73) Assignee: KYNDRYL, INC., New York, NY (US)

( * ) Notice: Subject to any disclaimer, the term of this patent is extended or adjusted under 35 U.S.C. 154(b) by 38 days.

(21) Appl. No.: 17/301,290

(22) Filed: Mar. 30, 2021

(51) Int. Cl.
*G06F 12/0862* (2016.01)
*G06N 20/20* (2019.01)

(52) U.S. Cl.
CPC ......... *G06F 12/0862* (2013.01); *G06N 20/20* (2019.01); *G06F 2212/602* (2013.01)

(58) Field of Classification Search
None
See application file for complete search history.

(56) References Cited

U.S. PATENT DOCUMENTS

| | | | |
|---|---|---|---|
| 8,468,251 B1 | 6/2013 | Pijewski | |
| 8,799,902 B2 | 8/2014 | Illikkal | |
| 9,489,236 B2 | 11/2016 | Kishan | |
| 9,703,664 B1 * | 7/2017 | Alshawabkeh | G06F 3/067 |
| 9,906,424 B2 | 2/2018 | Huang | |
| 9,983,795 B1 * | 5/2018 | Naamad | G06F 3/0629 |
| 10,339,455 B1 * | 7/2019 | Parush-Tzur | G06F 3/061 |

(Continued)

OTHER PUBLICATIONS

"Block IO Controller", The Linux kernel user's and administrator's guide, © Copyright The kernel development community, last printed Mar. 29, 2021, 6 pages, <https://www.kernel.org/doc/html/latest/admin-guide/cgroup-v1/blkio-controller.html>.

(Continued)

*Primary Examiner* — William E. Baughman
(74) *Attorney, Agent, or Firm* — Erik C. Swanson, Esq.; Blanche E. Schiller, Esq.; Heslin Rothenberg Farley & Mesiti P.C.

(57) ABSTRACT

A computer directs activity within a computer storage subsystem. The computer identifies a computer operating environment including a computer, and a storage subsystem connected to a group of storage devices. The compute receives metadata representing current and historic performance metrics of said computer operating environment. The computer identifies a first device associated with a first behavior profile governed by a power law distribution, and a second device associated with a second behavior profile governed by a normal distribution. The computer trains Machine Learning (ML) models based on the behavior profiles. The computer establishes Device Performance Rules based on the ML models. The computer forecasts time-based storage system requirements based, at least in part on the Device Performance Rules. The computer prefetches data to a cache component based, at least in part on said forecasted system requirements, in accordance with a time reference available to said computer.

20 Claims, 5 Drawing Sheets

(56) References Cited

U.S. PATENT DOCUMENTS

| | | |
|---|---|---|
| 2009/0138616 A1 | 5/2009 | Alvarez |
| 2013/0254407 A1 | 9/2013 | Pijewski |
| 2016/0299697 A1 | 10/2016 | Chen |
| 2017/0017576 A1* | 1/2017 | Cammarota ........ G06F 12/0893 |
| 2017/0060769 A1* | 3/2017 | Wires ................. G06F 11/3452 |
| 2017/0220387 A1* | 8/2017 | Borowiec ............ G06F 3/0604 |
| 2017/0286209 A1* | 10/2017 | Heroor ................ G06F 11/0727 |
| 2018/0113640 A1* | 4/2018 | Fernandez ........... G06F 3/0638 |
| 2018/0136839 A1* | 5/2018 | Brue ....................... G06F 3/061 |
| 2019/0042129 A1* | 2/2019 | Tarango .................. G06F 3/067 |
| 2019/0179647 A1 | 6/2019 | Deka |
| 2020/0192572 A1* | 6/2020 | Dwarampudi ...... G06F 11/3034 |
| 2020/0372401 A1 | 11/2020 | Mallick |
| 2021/0011830 A1* | 1/2021 | Khokhar ............... G06F 3/0632 |
| 2022/0188028 A1* | 6/2022 | Mesnier ............... G06F 3/0604 |

OTHER PUBLICATIONS

Mell, et al., "The NIST Definition of Cloud Computing", National Institute of Standards and Technology, Special Publication 800-145, Sep. 2011, 7 pages.

Schmidt, et al., "DS8000 I/O Priority Manager", Redpaper, IBM, © Copyright IBM Corp. 2012, 84 pages, <www.redbooks.ibm.com/redpapers/pdfs/redp4760.pdf>.

\* cited by examiner

FIG. 5

ANALYTICS-DRIVEN DIRECTION FOR COMPUTER STORAGE SUBSYSTEM DEVICE BEHAVIOR

BACKGROUND

The present invention relates generally to the field of computer component activity management and more specifically, to a method of dynamically adjusting storage subsystem interactions.

Computer operating environments may include a variety of interconnected components that need to share a limited quantity of resources. In some computing environments, components and applications are shared in a network of distributed and mainframe systems. In such cases, application response time can become a factor of contention, as the applications compete for access to resources needed to provide services requested by users. Methods to address this contention can improve system operating efficiency and increase overall user satisfaction.

SUMMARY

According to one embodiment, a computer-implemented method for directing activity within a computer storage subsystem includes identifying a computer operating environment having a computer, and a storage subsystem operatively connected to a plurality of storage devices. The computer receives, from a metadata source, metadata representing current and historic performance metrics of the computer operating environment. The computer identifies, within the plurality of devices, a first device (e.g., a storage device, including flash systems, etc.) associated with a first behavior profile governed by a power law distribution, and a second device (e.g., a computing device, such as x86 devices) associated with a second behavior profile (e.g., described by CPU time, transaction response time, etc.) governed by a normal distribution. The computer trains a first Machine Learning (ML) model and a second ML model each based, respectively, on the first and second behavior profiles. The computer establishes a set of Device Performance Rules (DPRs) based on the ML models. The computer forecasts time-based storage system requirements based, at least in part on the DPRs. The computer prefetches data to a cache component based, at least in part on the forecasted system requirements, in accordance with a time reference available to the computer. According to aspects of the invention, the computer groups the storage devices into a groups of application zones based on, at least in part, a common application associated with the devices. According to aspects of the invention, the computer establishes a corresponding group of zone access protocols based, at least in part on the DPRs, and guides activity of the storage devices based, at least in part, on the zone access protocols. According to aspects of the invention, the DPRs are based on an ML ensemble model that considers each of said ML models. According to aspects of the invention, the ML ensemble is generated via a "bagging with random forest" algorithm. It is noted that a difference between Bagging and Random Forest is that in Random Forests, only a subset of features is selected at random out of the total feature set, and the best split feature from the subset is used to split each node in a tree, unlike in Bagging where all features are considered for splitting a node. Although in some respects, Bagging and Random Forests are different, it is also noted that since Random Forests drop the least likely trees, Random Forests have traits of bagging. Aspects of the invention, drop the least likely tree (i.e as seen in Bagging), rather than using all the Random Forest trees.

According to aspects of the invention, the power law is a Pareto distribution.

According to aspects of the invention, the guiding of the storage device behavior is carried out, at least in part, by a Field Programmable Gate Array (FPGA) within a core layer of a processor associated with the storage subsystem. According to aspects of the invention, the first device is additionally associated with the second behavior protocol. According to aspects of the invention, the computer determines the behavior profiles by analyzing the metadata.

According to another embodiment, a system to direct activity within a computer storage subsystem comprises: a computer system comprising a computer readable storage medium having program instructions embodied therewith, the program instructions executable by a computer to cause the computer to: identify a computer operating environment including a computer, and a storage subsystem operatively connected to a plurality of storage devices; receive, from a metadata source, metadata representing current and historic performance metrics of said computer operating environment; identify, within the plurality of devices, a first device (e.g., a storage device, including flash systems, etc.) associated with a first behavior profile governed by a power law distribution, and a second device (e.g., a computing device, such as x86 devices) associated with a second behavior profile (e.g., described by CPU time, transaction response time, etc.) governed by a normal distribution; train a first Machine Learning (ML) model and a second ML model each based, respectively, on said first and second behavior profiles; establish a set of Device Performance Rules (DPRs) based on said ML models; forecasting, by said computer, time-based storage system requirements based, at least in part on said DPRs; and prefetching, by said computer, data to a cache component based, at least in part on said forecasted system requirements, in accordance with a time reference available to said computer.

According to another embodiment, a computer program product to direct activity within a computer storage subsystem, the program instructions executable by a computer to cause the computer to: identify, using a computer operating environment including a computer, and a storage subsystem operatively connected to a plurality of storage devices; receive, using said computer, from a metadata source, metadata representing current and historic performance metrics of said computer operating environment; identify, using said computer, within the plurality of devices, a first device associated with a first behavior profile governed by a power law distribution, and a second device associated with a second behavior profile governed by a normal distribution; train, using said computer, a first Machine Learning (ML) model and a second ML model each based, respectively, on said first and second behavior profiles; establish, using said computer, a set of Device Performance Rules (DPRs) based on said ML models; forecasting, using said computer, by said computer, time-based storage system requirements based, at least in part on said DPRs; and prefetching, using said computer, by said computer, data to a cache component based, at least in part on said forecasted system requirements, in accordance with a time reference available to said computer.

The present disclosure recognizes and addresses the shortcomings and problems associated with prioritizing resources for latency sensitive applications over other applications. Aspects of the invention are especially suited dynamically addressing resource demands associated with storage subsystems. Aspects of the invention use system operation analytics for dynamic resource throttling of storage subsystems based on application priorities that can apply across multiple blocks, files, objects, and associated Count Key Data (CKD). Aspects of the invention address performance of external storage solutions (e.g., Storage Area Networks (SANs)) to support associated application operation. Aspects of this invention address improve storage subsystem operation without relying on expert intervention and can be implemented on a variety of storage subsystems.

Aspects of the invention use near real-time, hardware driven (e.g., mounted on a Field Programmable Gate Array (FPGA)) I/O throttling which operates effectively regardless of host system operating system. Aspects of the invention use dynamic, real-time throttling based on application priorities and forecasted requirements so that high priority applications acquire suitable portions of available resources. Aspects of this present invention use machine learning to analyze and develop workload resource consumption and behavioral patterns to schedule storage resource allocation beforehand to improve data access, thereby improving workload execution enhancing the associated end-user experience. Aspects of the invention generate time-based views of application resource demand patterns, thereby guiding I/O intensive application scheduling. Aspects of the invention use machine learning to analyze and develop models of workload patterns to guide data prefetching (e.g., proactively transferring selected data identified via a machine-learning-model-based forecast from one or more hardware-based components into a cache element) to increase performance (e.g., through reduced latency, improved responsiveness, and so forth) of read operations. Aspects of the invention guide I/O throttling and, optionally, acceleration for specific applications running on a set of hosts serving a specific business unit or a specific client in multi-tenancy deployments.

Embodiments of the invention draw contemporaneously captured metadata reflecting the workload metrics and performance data of hosts and network systems (e.g., the CPU, memory statistics, workload characteristics (such as I/O sizes, I/O types, total input/output operations per second (IOPS), I/O queues, time specific IOPS, data accessed, availability, and response times) of components in system data paths. According to aspects of the invention, this metadata can come from various system and application performance managers.

According to a machine learning engine with contemporaneous, real time access to metadata content (e.g., such as that contained in a system data lake) centrally processes the real-time data, determines application characteristics and identifies dynamically changing workload metrics such as system utilization, time specific job activity, I/O bursts etc. Based on these analytics, in embodiments of the invention, application workload and resource requirements are forecast, and resource throttling/expansion is performed. For example, according to aspects of the invention, during peak business hours on weekdays when real-time transactional user applications are running, their I/O and throughput requirements are prioritized and forecasted based on the analysis of historical data. Similarly, during off-peak hours, there may be a need to prioritize resources for critical batch applications. These requirements and patterns are then used to configure the storage subsystem throttling across the storage systems accessed by these applications.

According to aspects of the invention, configuration of I/O throttling/expansion occurs via a rules-based engine which defines, and schedules Device Interaction Rules (DIRs) based on real time metrics and historical patterns. The real time feed of workload metrics to the ML engine guides allows the storage subsystem to make dynamic resource allocation decisions for a specific host/application. According to aspects of the invention, the machine learning engine processes the workload characteristics and creates time-based patterns of read I/Os for a specific data access, and the storage subsystem prefetches the data from hardware layer (disk/SSD/flash module) to cache to enhance the read response times. For example, consider a data warehouse utilizing multiple underlying relational databases. Although many database workloads are transactional and random, when a weekly batch job runs, the workload changes from random to sequential, and aspects of the present invention proactively prefetch the data needed for the weekly job to improve operational efficiency, reduces response times, and decrease latency. Aspects of the invention are suited to for use in environments with read intensive workloads that benefit from reduced response time (e.g., environments associated with artificial Intelligence (AI), Machine Learning (ML), analytics, business intelligence, and so forth).

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. The drawings are set forth as below as.

DETAILED DESCRIPTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a participant" includes reference to one or more of such participants unless the context clearly dictates otherwise.

Figure 1:
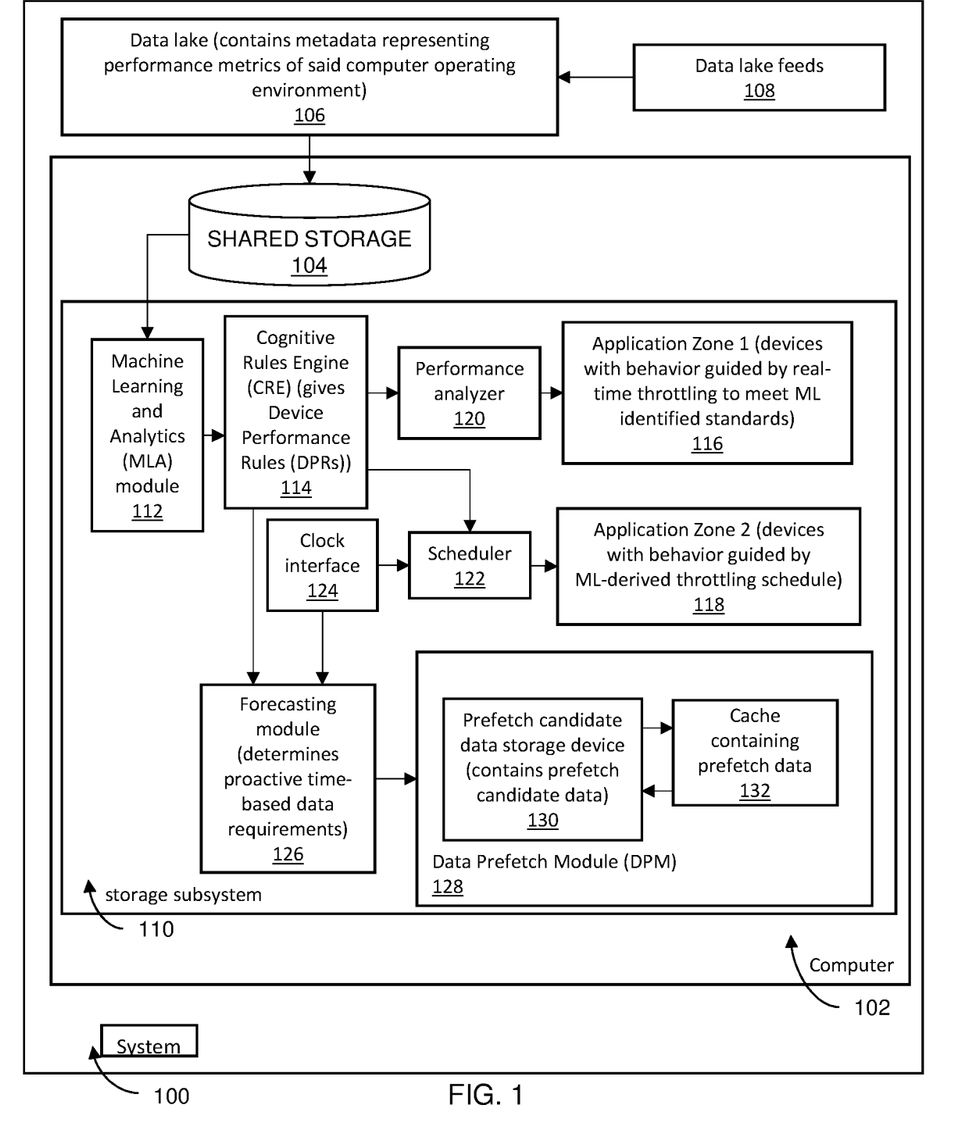
FIG. 1 is a schematic block diagram illustrating an overview of a system for computer-implemented method of directing activity within a computer storage subsystem according to embodiments of the present invention.
Figure 2:
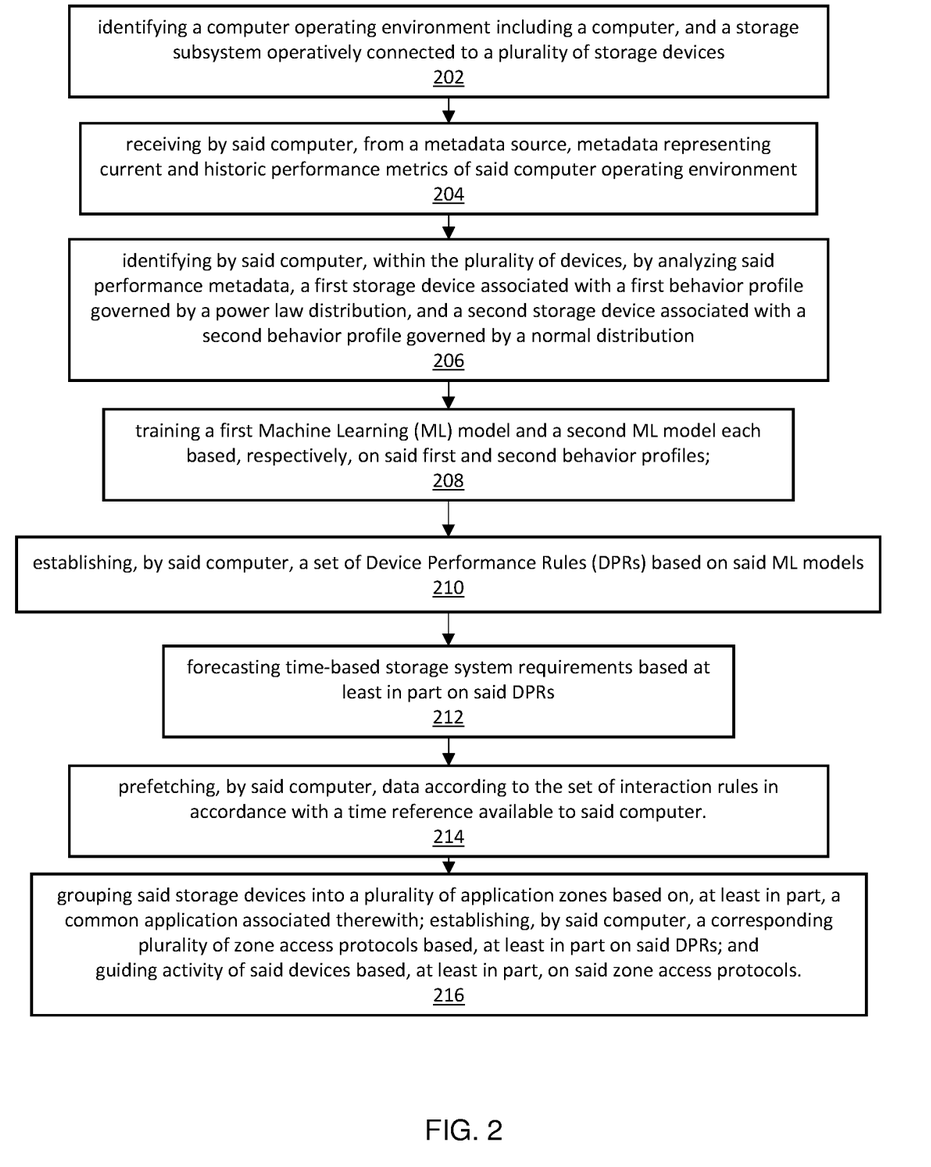
FIG. 2 is a flowchart illustrating a method, implemented using the system shown in FIG. 1, of directing activity within a computer storage subsystem according to aspects of the invention.

Now with combined reference to the Figures generally and with particular reference to FIG. 1 and FIG. 2, an overview of a computer implemented method of directing activity within a computer storage subsystem will be provided. The method is associated with a computer operating environment or system 100 and carried out by a server computer 102 having optionally shared storage 104. The server computer 102 receives metadata from a data lake 106 connected to a variety of data lake feeds 108.

According to aspects of the invention, the data lake feeds provide real-time performance information about various aspects of the system 100. In particular, the data lake feeds 108 provide a variety of system-specific information, including host to application mapping, application priorities, job schedules (including daily, monthly, and individual or one-off jobs), an indication of application type (e.g., transactional, sequential, latency sensitive, etc.), upstream and downstream interfaces (including internal, external, and third-party integrations), host performance data along an operational timeline (e.g., time-based processor, network and disk metrics, user count etc.), application workload metrics along the operational timeline (including transaction per sec, throughput per sec, transaction type, IO type, total input/output operations per second (IOPS), etc.). In an embodiment of the invention, the data lake feeds 108 provide continuously updated system metadata to the data lake 106.

The server computer 102 contains a storage subsystem 110 that is operatively connected with the data lake 106 and which contains data to generate insights that improve storage device performance. A Machine Learning and Analytics (MLA) module 112 analyzes information from data lake 106 (including, e.g., host, network and application characteristics), in combination with the internal storage performance metrics (e.g., IOPS, throughput, latency, cache hits etc.) identifies behavior profiles (some of which follow normal distribution patterns and others which follow non-standard distribution (e.g., Pareto or other power law distribution) and develops models that forecast I/O and resource requirements for the system applications. Some training data for the ML models indicates behavior that follows a standard distribution, and other training data indicates behavior that follows a non-standard (e.g., Pareto or "knee-of-the-curve") distribution.

The supervised learning includes training examples that include input objects (vectors) and the desired output value (a supervisory signal). This supervised learning algorithm analyzes the training data and produces an inferred function to map new examples and correctly determine the class labels for unseen instances. The learning algorithm will generalize from the training data in a reasonable way, and the quality is measured through generalization error. Training sets are representative of the real-world use of the function. Therefore, since the object of the game is to improve storage device performance, we can utilize (among other elements in more complex use cases) an IO component of overall response time. Feature vectors can also include items that are specific to the operating system (such as IOSQ, Pend, Disc, and Conn for mainframe and other like elements for midrange systems). Regardless of feature vectors chosen, the output value will be the total IO response time for the supervised learning. This gives a function where the input object and the output value are fed into the reshaping module (e.g., as seen in pandas according to this format, "NewData=LinearRegression(normalize=True)"). Unfortunately, there is no such function for a Pareto distribution. It is noted, however, that behavior would follow the pareto function, $p(x)=am^a/x^{a+1}$, where a is the shape and m is the scale.

Aspects of the invention correctly apply these patterns to predict impact of the IO data on the overall response time. This improves application requirement forecast accuracy, and these forecasts are then considered when dynamically throttling I/O in storage subsystems, in order to provide best storage I/O response to prioritized applications.

The choice of regression comes into play as previous studies haven't utilized a pareto distribution for their IO, which produces skewed data. This is the reason why IO subsystem impact on transaction response time and associated throttling hasn't been done before.

A Cognitive Rules engine generates a set of Device Performance Rules (DPRs) 114 that are used by the server computer 102 to develop resource throttles and performance enhancement operations for storage systems 116, 118. According to aspects of the invention, Pareto distribution applies to storage subsystem IO metrics.

According to aspects of the invention, application zones defined on the storage subsystems contain the set of hosts serving a specific application. When the throttle is applied on an application zone, it applies to the entire set of hosts and this helps to throttle the I/O for a set of hosts running specific applications serving specific business unit or client in multi-tenancy deployments. Meaning when the application A, which is served by set of hosts run a resource intensive operation, the storage system recognizes the need for allocating additional resources at the storage layer for this application zone to ensure the performance level is maintained. Aspects of the invention (e.g., throttling) allow freer access to the 10 for prioritized applications in the system.

According to aspects of the invention, the MLA 112 considers time-based application requirements and associated dynamic storage requirements, and the DPRs prioritize the storage device 116,118 access for prioritized applications appropriately. According to aspects of the invention, the DPRs also incorporate time-based and application-specific resource demands based on historical data included along with the provided metadata.

According to aspects of the invention, the storage subsystem 110 groups all devices (including hosts, storage volumes, etc.) that serve a specific application into groups of devices 116,118 (e.g., application zones), assigning priorities and associated zone access protocols accordingly. The zone access protocols guide I/O behavior for devices in the zones 116,118. For example, a zone access protocol can be set to slow the responsiveness of certain devices by adding a response delay (e.g., a throttling pause in the range between 10 ms to 20 ms) to action calls from low-priority applications.

In other situations, access protocols can be set to increase responsiveness (e.g., by responding to certain action calls before others). For example, the IOPS limit for a specific application is increased from 1000 to 10000 to cater to the workload requirements at that point in time. It is noted that application zones help throttle the I/O for sets of hosts running specific applications serving specific business unit or client in multi-tenancy deployments.

According to aspects of the invention, zone access protocols may be set dynamically, in response to performance metadata from the data lake 106. A performance analyzer 120 accesses current storage subsystem performance (e.g., using metadata from the data lake 106) and throttles or accelerates selected devices 116 to meet targeted performance standards, in accordance with the DPRs established cooperatively by the MLA 112 and Device Performance Rules Engine (DPRE) 114.

According to other aspects of the invention, zone access protocols may also be set according to a schedule. In embodiments of the invention, scheduler 122 cooperates with a clock interface 124 to apply a time-based device access protocol appropriate to provide desired operation characteristics for devices 118 supporting selected applications, according to the DPRs established cooperatively by the DPRE 114.

The storage subsystem 110 includes forecasting module 126 that proactively determines time-based data requirements from historical performance data included along with the provided metadata. The forecasting module 126, in cooperation the clock interface 124, directs a data prefetch module 128 to strategically deliver data from a hardware-based prefetch candidate data storage device 130 to a cache device to ensure fast access for the selected data. According to aspects of the invention, the storage device contains candidate data that may, at times cooperatively identified MLA 112 and DRE 114, be needed by high priority or latency sensitive applications. According to a guidance from the forecasting module 126, this candidate data is transferred as needed from the candidate data storage device 130 to a fast access cache element 132 to be available as needed, according to the data use needs determined by the forecasting module 126.

Now with particular reference to FIG. 2, a method to direct activity within a computer storage subsystem 110 using the system 100 described, according to aspects of the invention will be described. The server computer 102, at block 202 identifies a computer operating environment (e.g., the system 100) including a computer (e.g., server computer 102), and a storage subsystem 110 operatively connected to storage devices 116, 118. The server computer 102 receives, at block 204, from a metadata source (e.g., data lake 106), metadata representing current and historic performance metrics of the computer operating environment. The server computer 102, at block 206, identifies a first device (e.g., a storage device, including flash systems, etc.) associated with a first behavior profile governed by a power law distribution and a second device (e.g., a computing device, such as x86 devices) associated with a second behavior profile (e.g., described by CPU time, transaction response time, etc.) governed by a normal distribution. According to aspects of the invention, the server computer 102 determines the behavior profiles via analysis of the performance metadata. It is noted, in particular, that workload application data follows standard distribution patterns, while I/O subsystem data follows a Pareto distribution. The server computer accounts for these behavior profiles and generates Machine Language (ML) models accordingly. For example, standard linear regression is run on the workload application data, while pareto regression is performed on the 10 subsystem data. Note that Regression techniques are used to model the effect of independent variables on dependent variables, e.g., the effect of I/O request sizes on the request response time.

The server computer 102 uses these relationships, via Machine Learning and Analytics (MLA) module 112 at block 208, to train ML models according to the behavior profiles appropriate for the various components of the storage subsystem 110. According to aspects of the invention, MLA 112 processes the workload characteristics (e.g., as provided by metadata from the data lake 106) and creates time-based workload patterns (e.g., indications depicting the type of JO, number of IOPS, data patterns accessed and so forth). As will be described more fully below, the server computer 102 uses these behavior patterns to create models that, via the scheduler 122 and the forecasting module 126, guide storage device activity according to the DPRs established by the CRE 114.

According to aspects of the present invention, established techniques for ML modeling can be used to establish suitable models based on historic metadata data. However, it is noted that the Ensemble Bagging with Random Forests methodology generates models especially suited for use with embodiments of the system described 100.

Although first and second devices are shown schematically as belonging to distinct application zones 116,118, it is noted that any storage device may be placed into an application zone without regard to the behavior profile associated with the device. According to aspects of the invention, application zones are established according supported applications and associated zone access protocols are determined to meet DPRs established by the CRE 114.

The server computer 102, via Cognitive Rules Engine (CRE) 114 at block 210, generates a set of Device Performance Rules (DPRs) that guide storage device activity to meet identified system performance needs. In particular, the CRE 114 uses the ML models and metadata from the data lake 106 to capture, track, monitor, cognitively understand and forecast application behavior which will in turn determine the storage resource throttling and acceleration/expansion configurations for storage device behavior.

According to aspects of the invention, the CRE 114 is purpose-built software arranged to ensure lack of latency (e.g., installed in Field Programmable Gate Array (FPGA) located within a processor core layer of the storage subsystem 110) In an embodiment, the CRE 114 receives real time metrics and data of the workloads (e.g., provided by metadata from the data lake 106) and dynamically adjusts device protocols and activity.

According to another aspect of the invention, the storage subsystem 110, via the performance analyzer 120 and scheduler 122 apply access protocols (e.g., throttling parameters) in accordance with current performance and device access schedules, to using identified workload patterns. The storage subsystem 110 of the present invention improves system reliability and end-user experience by ensuring that critical application transactions receive storage device access appropriate to meet identified data requirements.

The server computer 102, via forecasting module 126 at block 214, determines time-based data requirements using historic metadata from the data lake 106. The forecasting module 126 directs the data prefetch module to proactively accommodate those requirements. In particular, the forecasting module 126, in cooperation with the clock interface 124, recognizes data (e.g., such as data applications for random access user-guided transactions during regular business hours and backup files storage needed during off-peak hours batch file work) needed for various operating times guides activity of the data prefetch module 128. According to aspects of the invention, the server computer at block 214, transfers selected files recognized by the forecaster from the hardware-based prefetch candidate data storage device 130 to fast-access cache element 132. When the forecasting module 126 deems the cached data in the prefetch cache element 132 is no longer relevant, new data is transferred from the prefetch candidate data storage device 130.

The server computer 102 at block 216 groups the storage devices 116, 118 into a plurality of application zones based on, at least in part, a common application. The server computer 102, establishes corresponding plurality of zone access protocols based, at least in part on the DPRs and guides activity of the devices based, at least in part, on said zone access protocols.

Regarding the flowcharts and block diagrams, the flowchart and block diagrams in the Figures of the present disclosure illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 3:
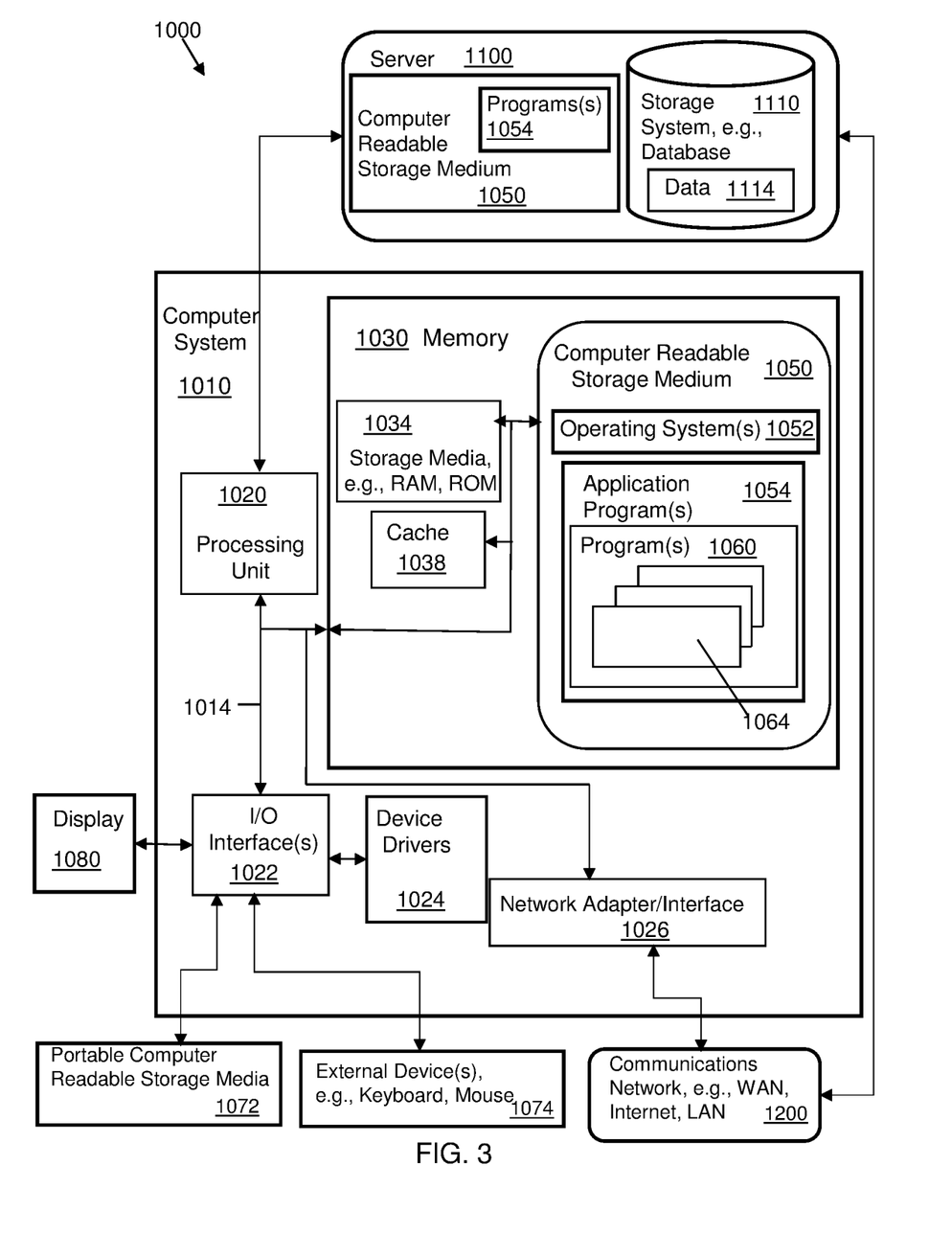
FIG. 3 is a schematic block diagram depicting a computer system according to an embodiment of the disclosure which may be incorporated, all or in part, in one or more computers or devices shown in FIG. 1, and cooperates with the systems and methods shown in FIG. 1.

Referring to FIG. 3, a system or computer environment 1000 includes a computer diagram 1010 shown in the form of a generic computing device. The method of the invention, for example, may be embodied in a program 1060, including program instructions, embodied on a computer readable storage device, or computer readable storage medium, for example, generally referred to as memory 1030 and more specifically, computer readable storage medium 1050. Such memory and/or computer readable storage media includes non-volatile memory or non-volatile storage. For example, memory 1030 can include storage media 1034 such as RAM (Random Access Memory) or ROM (Read Only Memory), and cache memory 1038. The program 1060 is executable by the processor 1020 of the computer system 1010 (to execute program steps, code, or program code). Additional data storage may also be embodied as a database 1110 which includes data 1114. The computer system 1010 and the program 1060 are generic representations of a computer and program that may be local to a user, or provided as a remote service (for example, as a cloud based service), and may be provided in further examples, using a website accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in the figure as program modules 1064. The program 1060 and program modules 1064 can execute specific steps, routines, sub-routines, instructions or code, of the program.

The method of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

The computer 1010 can include a variety of computer readable media. Such media may be any available media that is accessible by the computer 1010 (e.g., computer system, or server), and can include both volatile and non-volatile media, as well as, removable and non-removable media. Computer memory 1030 can include additional computer readable media in the form of volatile memory, such as random access memory (RAM) 1034, and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The method(s) described in the present disclosure, for example, may be embodied in one or more computer programs, generically referred to as a program 1060 and can be stored in memory 1030 in the computer readable storage medium 1050. The program 1060 can include program modules 1064. The program modules 1064 can generally carry out functions and/or methodologies of embodiments of the invention as described herein. The one or more programs 1060 are stored in memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020. It is also understood that the application 1054 and program(s) 1060 are shown generically, and can include all of, or be part of, one or more applications and program discussed in the present disclosure, or vice versa, that is, the application 1054 and program 1060 can be all or part of one or more applications or programs which are discussed in the present disclosure.

One or more programs can be stored in one or more computer readable storage media such that a program is embodied and/or encoded in a computer readable storage medium. In one example, the stored program can include program instructions for execution by a processor, or a computer system having a processor, to perform a method or cause the computer system to perform one or more functions.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
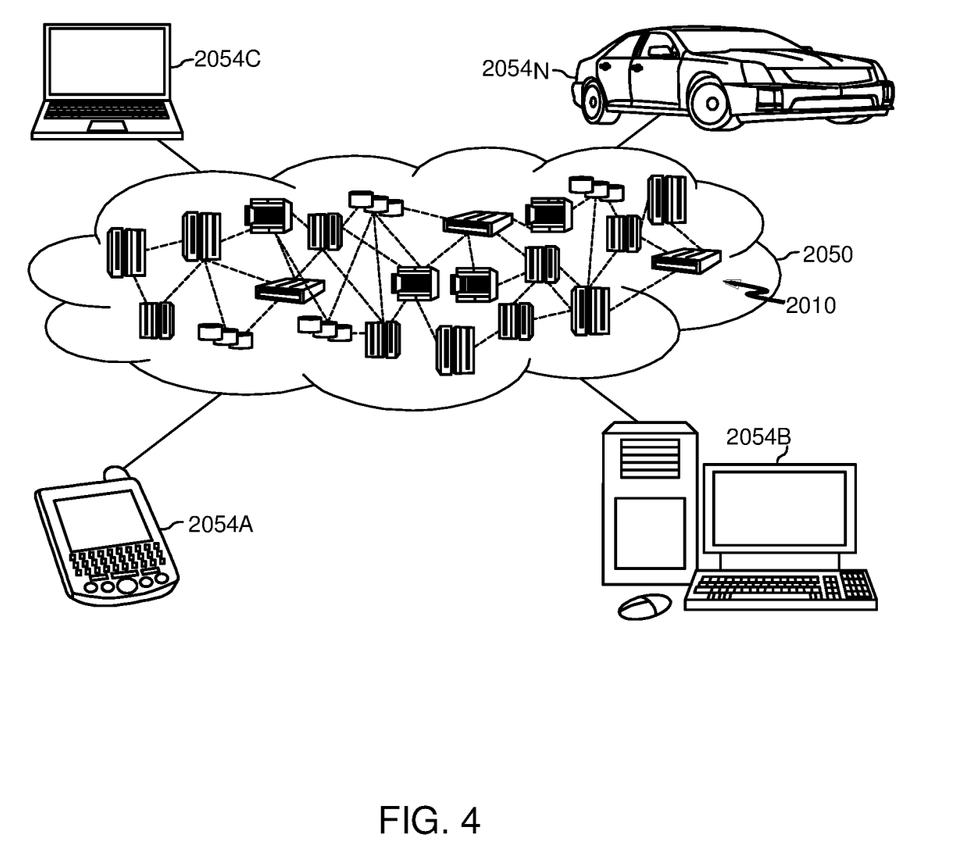
FIG. 4 depicts a cloud computing environment according to an embodiment of the present invention.

Referring now to FIG. 4, illustrative cloud computing environment 2050 is depicted. As shown, cloud computing environment 2050 includes one or more cloud computing nodes 2010 with which local computing devices used by cloud consumers, such as, for example, personal digital assistant (PDA) or cellular telephone 2054A, desktop computer 2054B, laptop computer 2054C, and/or automobile computer system 2054N may communicate. Nodes 2010 may communicate with one another. They may be grouped (not shown) physically or virtually, in one or more networks, such as Private, Community, Public, or Hybrid clouds as described hereinabove, or a combination thereof. This allows cloud computing environment 2050 to offer infrastructure, platforms and/or software as services for which a cloud consumer does not need to maintain resources on a local computing device. It is understood that the types of computing devices 2054A-N shown in FIG. 9 are intended to be illustrative only and that computing nodes 2010 and cloud computing environment 2050 can communicate with any type of computerized device over any type of network and/or network addressable connection (e.g., using a web browser).

Figure 5:
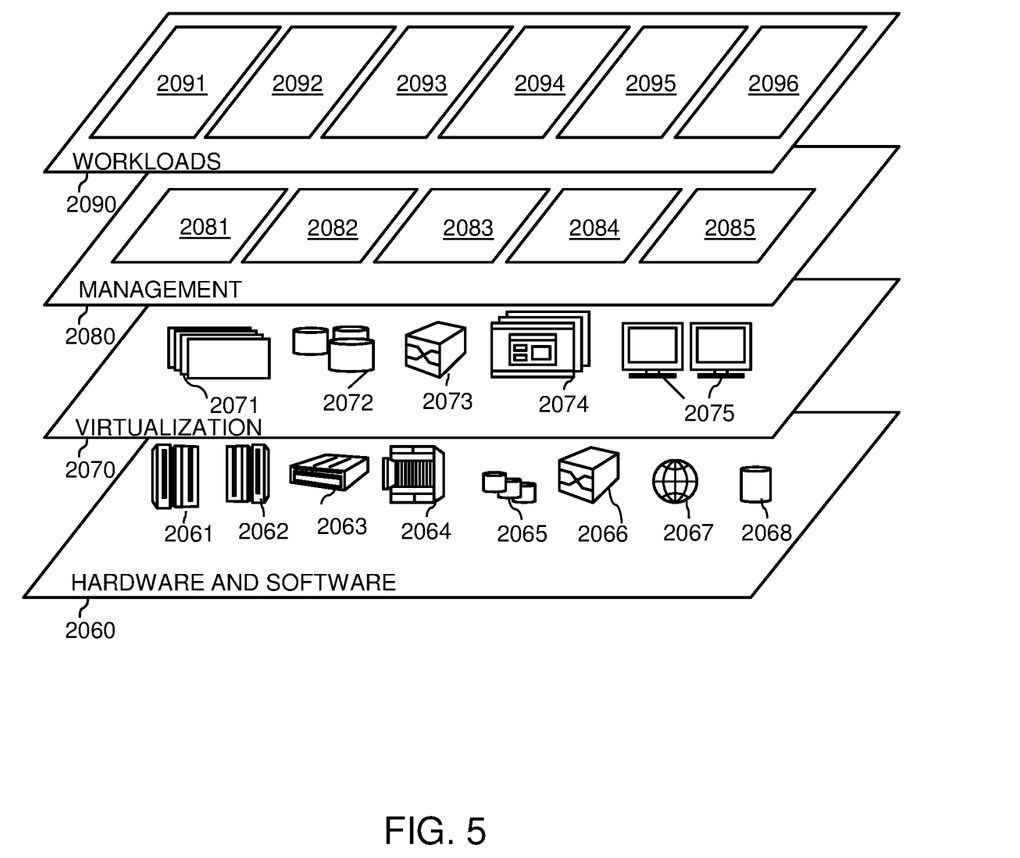
FIG. 5 depicts abstraction model layers according to an embodiment of the present invention.

Referring now to FIG. 5, a set of functional abstraction layers provided by cloud computing environment 2050 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 2060 includes hardware and software components. Examples of hardware components include: mainframes 2061; RISC (Reduced Instruction Set Computer) architecture based servers 2062; servers 2063; blade servers 2064; storage devices 2065; and networks and networking components 2066. In some embodiments, software components include network application server software 2067 and database software 2068.

Virtualization layer 2070 provides an abstraction layer from which the following examples of virtual entities may be provided: virtual servers 2071; virtual storage 2072; virtual networks 2073, including virtual private networks; virtual applications and operating systems 2074; and virtual clients 2075.

In one example, management layer 2080 may provide the functions described below. Resource provisioning 2081 provides dynamic procurement of computing resources and other resources that are utilized to perform tasks within the cloud computing environment. Metering and Pricing 2082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 2083 provides access to the cloud computing environment for consumers and system administrators. Service level management 2084 provides cloud computing resource allocation and management such that required service levels are met. Service Level Agreement (SLA) planning and fulfillment 2085 provide pre-arrangement for, and procurement of, cloud computing resources for which a future requirement is anticipated in accordance with an SLA.

Workloads layer 2090 provides examples of functionality for which the cloud computing environment may be utilized. Examples of workloads and functions which may be provided from this layer include: mapping and navigation 2091; software development and lifecycle management 2092; virtual classroom education delivery 2093; data analytics processing 2094; transaction processing 2095; and directing activity within a computer storage subsystem 2096.

The descriptions of the various embodiments of the present invention have been presented for purposes of illustration, but are not intended to be exhaustive or limited to the embodiments disclosed. Likewise, examples of features or functionality of the embodiments of the disclosure described herein, whether used in the description of a particular embodiment, or listed as examples, are not intended to limit the embodiments of the disclosure described herein, or limit the disclosure to the examples described herein. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method of directing activity within a computer storage subsystem, comprising:
  identifying a computer operating environment including a computer, and a storage subsystem operatively connected to a plurality of storage devices;

receiving by said computer, from a metadata source, metadata representing current and historic performance metrics of said computer operating environment;

identifying by said computer, within the plurality of devices, a first device associated with a first behavior profile governed by a power law distribution, and a second device associated with a second behavior profile governed by a normal distribution;

training, by said computer, a first Machine Learning (ML) model and a second ML model each based, respectively, on said first and second behavior profiles;

establishing, by said computer, a set of Device Performance Rules (DPRs) based on said ML models;

forecasting, by said computer, time-based storage system requirements based, at least in part on said DPRs; and prefetching, by said computer, data to a cache component based, at least in part on said forecasted system requirements, in accordance with a time reference available to said computer.

2. The method of claim 1, further including grouping said storage devices into a plurality of application zones based on, at least in part, a common application associated therewith;

establishing, by said computer, a corresponding plurality of zone access protocols based, at least in part on said DPRs; and guiding activity of said storage devices based, at least in part, on said zone access protocols.

3. The method of claim 1, wherein said DPRs are based on an ML ensemble model that considers each of said ML models.

4. The method of claim 3, wherein said ML ensemble is generated via a "bagging with random forest" algorithm.

5. The method of claim 1, wherein said power law is a Pareto distribution.

6. The method of claim 2, wherein said guiding of said storage device behavior is carried out, at least in part, by a Field Programmable Gate Array (FPGA) within a core layer of a processor associated with said storage subsystem.

7. The method of claim 1, wherein said first device is additionally associated with said second behavior protocol.

8. The method of claim 1, wherein said computer determines said behavior profiles by analyzing said metadata.

9. A system to direct activity within a computer storage subsystem, which comprises:

a computer system comprising a computer readable storage medium having program instructions embodied therewith, the program instructions executable by a computer to cause the computer to:

identify a computer operating environment including a computer, and a storage subsystem operatively connected to a plurality of storage devices;

receive, from a metadata source, metadata representing current and historic performance metrics of said computer operating environment;

identify, within the plurality of devices, a first device associated with a first behavior profile governed by a power law distribution, and a second device associated with a second behavior profile governed by a normal distribution;

train a first Machine Learning (ML) model and a second ML model each based, respectively, on said first and second behavior profiles;

establish a set of Device Performance Rules (DPRs) based on said ML models;

forecasting, by said computer, time-based storage system requirements based, at least in part on said DPRs; and prefetching, by said computer, data to a cache component based, at least in part on said forecasted system requirements, in accordance with a time reference available to said computer.

10. The system of claim 9 further including instructions causing said computer to group said storage devices into a plurality of application zones based, at least in part, on a common application associated therewith; establish, a corresponding plurality of zone access protocols based, at least in part, on said DPRs; and guide activity of said storage devices based, at least in part, on said zone access protocols.

11. The system of claim 9, wherein said DPRs are based on an ML ensemble model that considers each of said ML models.

12. The system of claim 9, wherein said power law is a Pareto distribution.

13. The system of claim 10, wherein said guiding of said storage device behavior is carried out, at least in part, by a Field Programmable Gate Array (FPGA) within a core layer of a processor associated with said storage subsystem.

14. The system of claim 9, wherein said first device is additionally associated with said second behavior protocol.

15. The system of claim 9, wherein said computer determines said behavior profiles by analyzing said metadata.

16. A computer program product to direct activity within a computer storage subsystem, the program instructions executable by a computer to cause the computer to:

identify, using a computer operating environment including a computer, and a storage subsystem operatively connected to a plurality of storage devices;

receive, using said computer, from a metadata source, metadata representing current and historic performance metrics of said computer operating environment;

identify, using said computer, within the plurality of devices, a first device associated with a first behavior profile governed by a power law distribution, and a second device associated with a second behavior profile governed by a normal distribution;

train, using said computer, a first Machine Learning (ML) model and a second ML model each based, respectively, on said first and second behavior profiles;

establish, using said computer, a set of Device Performance Rules (DPRs) based on said ML models;

forecasting, using said computer, by said computer, time-based storage system requirements based, at least in part on said DPRs; and prefetching, using said computer, by said computer, data to a cache component based, at least in part on said forecasted system requirements, in accordance with a time reference available to said computer.

17. The computer program product of claim 16 further including instructions causing said computer to group said storage devices into a plurality of application zones based, at least in part, on a common application associated therewith; establish, a corresponding plurality of zone access protocols based, at least in part, on said DPRs; and guide activity of said storage devices based, at least in part, on said zone access protocols.

18. The computer program product of claim 16, wherein said DPRs are based on an ML ensemble model that considers each of said ML models.

19. The computer program product of claim 17, wherein said guiding of said storage device behavior is carried out, at least in part, by a Field Programmable Gate Array (FPGA) within a core layer of a processor associated with said storage subsystem.

20. The computer program product of claim 16, wherein said computer determines said behavior profiles by analyzing said metadata.

\* \* \* \* \*